(12) United States Patent
Christaldi

(10) Patent No.: US 6,224,338 B1
(45) Date of Patent: May 1, 2001

(54) POLYGONAL WINDMILL

(75) Inventor: Samuel Edward Christaldi, Manassas Park, VA (US)

(73) Assignee: Samuel Christaldi, Manassas Park, VA (US)

( * ) Notice: Subject to any disclaimer, the term of this patent is extended or adjusted under 35 U.S.C. 154(b) by 0 days.

(21) Appl. No.: 09/494,306

(22) Filed: Jan. 31, 2000

Related U.S. Application Data

(60) Provisional application No. 60/138,011, filed on Jun. 8, 1999.

(51) Int. Cl.[7] ............................................. F03D 11/00
(52) U.S. Cl. .................. 416/223 R; 415/4.1; 415/4.3; 415/4.5; 415/905; 415/908
(58) Field of Search ................. 415/4.1, 4.2, 4.3, 415/4.5, 905, 908; 416/197 A, 196 R, 196 A, DIG. 4, 223 R; 290/44, 55

(56) References Cited

U.S. PATENT DOCUMENTS

| | | | | |
|---|---|---|---|---|
| 464,224 | * | 12/1891 | Hosey ................................... 415/2.1 |
| 1,811,441 | * | 6/1931 | Smith ................................ 416/197 A |
| 4,357,130 | * | 11/1982 | Forrest .............................. 416/197 A |
| 4,375,035 | * | 2/1983 | Groeger .................................. 290/55 |
| 4,449,887 | * | 5/1984 | Mundhenke ............................. 415/4 |
| 4,486,143 | * | 12/1984 | McVey ................................... 415/2.1 |

* cited by examiner

Primary Examiner—Edward K. Look
Assistant Examiner—Ninh Nguyen

(57) ABSTRACT

The polygonal windmill is essentially a windmill with the blade components contained within a rigid polygonal frame, preferably cubic in shape. The polygonal windmill relies on its much larger wind surface area rather than high speeds for energy production. The simple design of the frame and the blades allow the windmill to be constructed with off-the-shelf components and materials, i.e. minimal engineering and manufacturing costs, and minimal labor to construct the windmill. No special cutting or shaping of the blades is needed in the production of the polygonal windmill.

17 Claims, 1 Drawing Sheet

POLYGONAL WINDMILL

This application claims benefit of Provisional appl. 60/138,011, filed Jun. 08, 1999.

BACKGROUND OF THE INVENTION

The world is dependent on natural resources for the production of energy. This dependence is resulting in a depletion of the natural resources available in the world. Also, the pollution produced as a result of using natural resources has become a problem that will last for generations to come.

Industry is concerned with the increase in prices for natural resources since these costs directly impact the competitive pricing of their products. Consumers are concerned with the price they must pay for electricity. Analysts are concerned with the diminishing supply of natural resources. Environmentalists are concerned with the pollution caused by using natural resources in the production of energy and the consequences of an accident at a nuclear power plant.

Wind is a renewable energy source that can be used to produce energy rather than non-renewable sources such as coal or oil. Wind energy can replace nuclear power plants if the technology and cost savings were found.

SUMMARY OF THE INVENTION

Traditionally, windmills have required extensive cutting and shaping of the blades, resulting in high engineering and manufacturing costs. Also, traditional windmills rely on either/or high wind speeds or high altitude posts.

The polygonal windmill relies on its much larger wind surface area rather than high speeds for energy production. But the faster the wind, the greater the amount energy produced by the polygonal windmill. A high altitude post would enhance the performance of the polygonal windmill but is not needed for its operation.

The polygonal windmill is physically and structurally stronger than traditional windmills. It can withstand wind speeds that would normally destroy traditional windmills.

The polygonal windmill is essentially a windmill with the blade components contained within a rigid polygonal frame, preferably cubic in shape. The simple design of the frame and the blades allow the windmill to be constructed with off-the-shelf components and materials, i.e. minimal engineering and manufacturing costs, and minimal labor to construct the windmill. No special cutting or shaping of the blades is needed in the production of the polygonal windmill.

DETAILED DESCRIPTION OF THE INVENTION

Traditionally, windmills have required extensive cutting and shaping of the blades, resulting in high engineering and manufacturing costs. The semi-cube windmill is essentially a windmill with the blade components contained within a rigid polygonal frame, preferably cubic in shape. The simple design of the frame and the blades allow the windmill to be constructed with off-the-shelf components and materials, i.e. minimal engineering and manufacturing costs.

Figure 1:
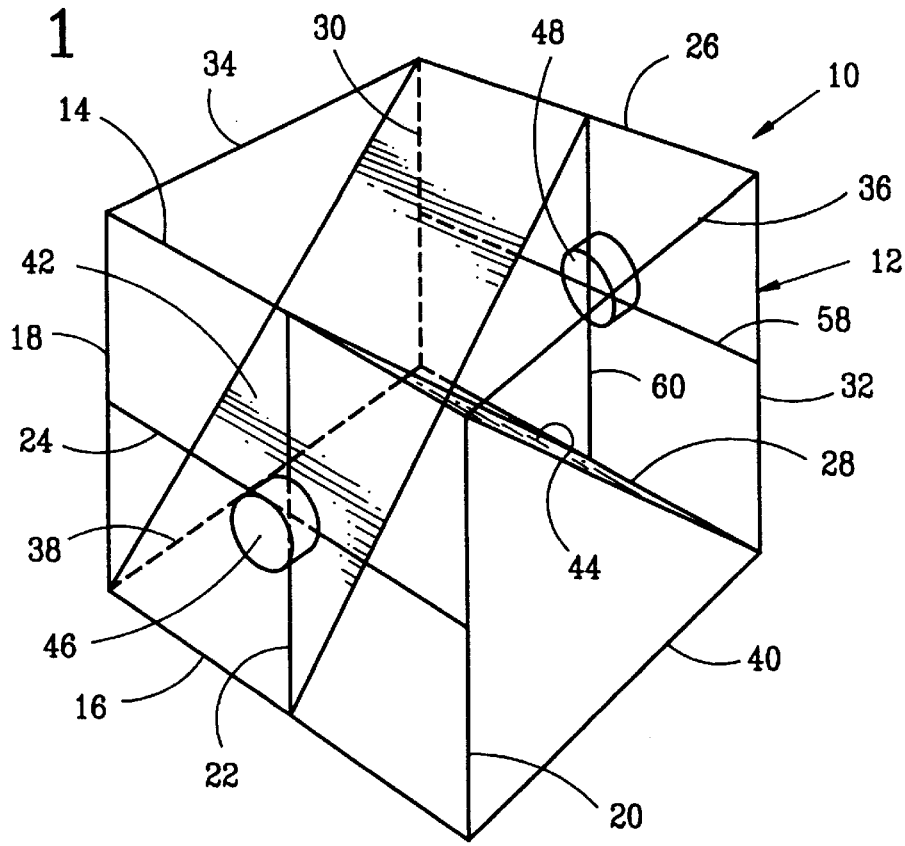
FIG. 1 shows the first embodiment of the invention

With reference to FIG. 1, the first embodiment of the polygonal windmill 10 includes a rigid, cubic shaped frame 12. The frame 12 comprises a front rectangular shaped section made of horizontal members 14, 16 and vertical members 18, 20. Vertical axis member 22 and a horizontal axis member 24 are on the front section of windmill 10. The frame 12 comprises a rear rectangular shaped section made of horizontal members 26, 28 and vertical members 30, 32. Vertical axis member 60 and a horizontal axis member 58 are on the rear section of windmill 10. The front and rear rectangular shaped sections of frame 12 are connected together at the corners by connecting members 34, 36, 38, 40. Connecting member 34 connects the corner where horizontal member 14 and vertical member 18 are joined to the corner where horizontal member 26 and vertical member 30 are joined. Connecting member 36 connects the corner where horizontal member 14 and vertical member 20 are joined to the corner where horizontal member 26 and vertical member 32 are joined. Connecting member 38 connects the corner where horizontal member 16 and vertical member 18 are joined to the corner where horizontal member 28 and vertical member 30 are joined. Connecting member 40 connects the corner where horizontal member 16 and vertical member 20 are joined to the corner where horizontal member 28 and vertical member 32 are joined. Ideally, frame 12 is made of galvanized steel, but other rigid building materials such as wood, pressure treated wood or plastic may be used to construct frame 12.

Blades 42, 44 are within frame 12 and are rectangular in shape. Blade 42 is connected from the front rectangular section from horizontal member 16 to the rear rectangular section to horizontal member 26. Blade 44 is connected from the front rectangular section from horizontal member 14 to the rear rectangular section to horizontal member 28. Preferably, the blades are made of sheet metal, but other sheet materials, such as cloth, i.e., canvas sails or plastic sheet material may be used for making the blades 42, 44.

Electric generators 46,48 are connected to windmill 10 to convert wind energy to electrical energy. Electrical generator 46 is connected in a conventional manner at the intersection of vertical axis 22 and horizontal axis 24. Electrical generator 48 is connected in a conventional manner at the intersection of vertical axis 60 and horizontal axis 58.

Figure 2:
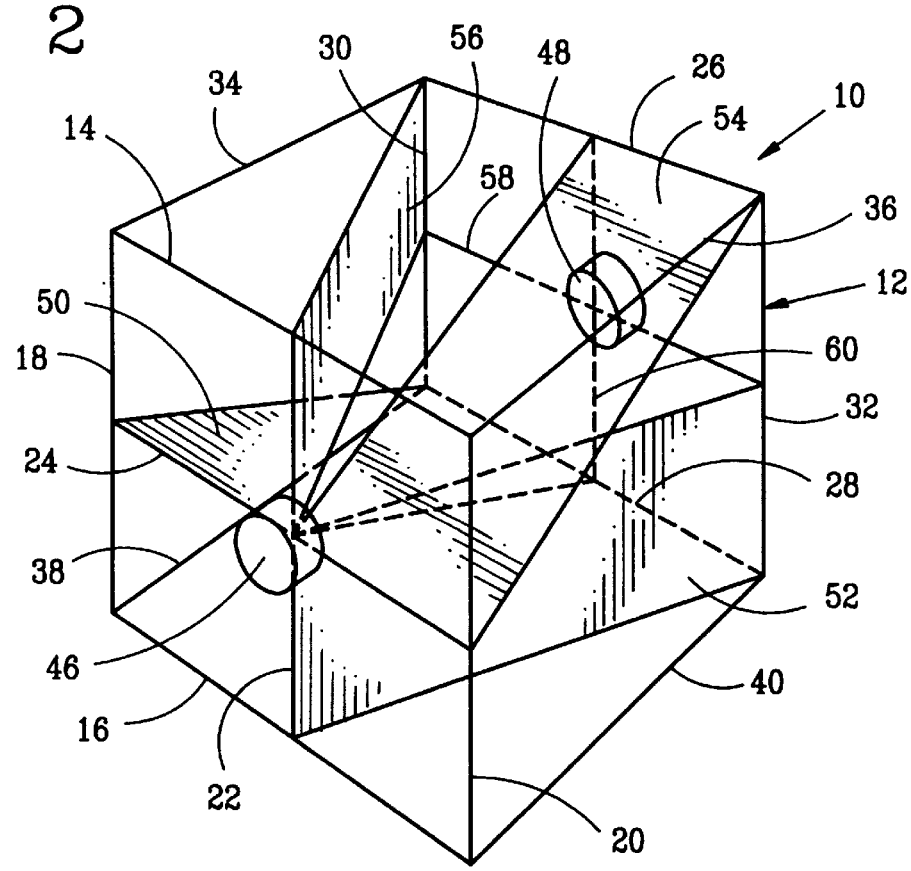
FIG. 2 shows the second embodiment of the invention.

With reference to FIG. 2, the second embodiment of the semi-cube windmill 10 includes a rigid, cubic shaped frame 12. The frame 12 comprises a front rectangular shaped section made of horizontal members 14, 16 and vertical members 18, 20. Vertical axis member 22 and a horizontal axis member 24 are on the front section of windmill 10. The frame 12 comprises a rear rectangular shaped section made of horizontal members 26, 28 and vertical members 30, 32. Vertical axis member 60 and a horizontal axis member 58 are on the rear section of windmill 10. The front and rear rectangular shaped sections of frame 12 are connected together at the corners by connecting members 34, 36, 38, 40. Connecting member 34 connects the corner where horizontal member 14 and vertical member 18 are joined to the corner where horizontal member 26 and vertical member 30 are joined. Connecting member 36 connects the corner where horizontal member 14 and vertical member 20 are joined to the corner where horizontal member 26 and vertical member 32 are joined. Connecting member 38 connects the corner where horizontal member 16 and vertical member 18 are joined to the corner where horizontal member 28 and vertical member 30 are joined. Connecting member 40 connects the corner where horizontal member 16 and vertical member 20 are joined to the corner where horizontal member 28 and vertical member 32 are joined. Ideally, frame 12 is made of galvanized steel, but other rigid building materials such as wood, pressure treated wood or plastic may be used to construct frame 12.

Blades 50, 52, 54, 56 are within frame 12 and are rectangular in shape. Blade 50 is connected from the left part of horizontal axis member 24 of the front rectangular section to the left part of horizontal member 28 of the rear rectangular section of the frame 12. Blade 52 is connected from the bottom part of vertical axis member 22 of the front rectangular section to the bottom part of vertical member 32 of the rear rectangular section of frame 12. Blade 54 is connected from the right part of horizontal axis member 24 of the front rectangular section to the right part of horizontal member 26 of the rear rectangular section of the frame 12. Blade 56 is connected from the top part of vertical axis member 22 of the front rectangular section to the top part of vertical member 30 of the rear rectangular section of frame 12. Preferably, the blades are made of sheet metal, but other sheet materials, such as cloth, i.e., canvas sails or plastic sheet material may be used for making the blades 42, 44.

Electric generators 46,48 are connected to windmill 10 to convert wind energy to electrical energy. Electrical generator 46 is connected in a conventional manner at the intersection of vertical axis 22 and horizontal axis 24. Electrical generator 48 is connected in a conventional manner at the intersection of vertical axis 60 and horizontal axis 58.

Though the polygonal windmill has been described in terms of rectangular shapes for the frame and blades in the first and second embodiments. The scope of this invention encompasses polygonal frames shaped as pentagons, hexagons and even octagons.

What is claimed is:

1. A windmill comprising:
a multisided frame formed of an open framework through which wind can pass freely having a first multisided section and a second multisided section with each section having at least one corner;
said first section and said second section connected together by at least one connecting member at said at least one corner;
two blades immediately adjacent to each other, each defining a plane such that the defined planes are angularly disposed to a horizontal axis such that said horizontal axis intersects said defined planes connected at opposite ends of the blade to the multisided frame and completely contained within said multisided frame, such that as wind strikes the blade, the windmill is rotated about said horizontal axis;
at least one apparatus connected to the horizontal axis which is driven by the rotational force imparted by said windmill.

2. The windmill as set forth in claim 1 wherein
said first and second sections are rectangular in shape.

3. The windmill as set forth in claim 2 wherein
said first and second sections are square in shape.

4. The windmill as set forth in claim 2 wherein
said first section and said second section connected together by four connecting members such that each corner of the first section is connected by one of said connecting members to a corresponding corner of the second section.

5. The windmill as set forth in claim 1 wherein
two blades are contained within the frame of the windmill and are angularly disposed in different directions such that of each of the blades, one end of the blade is connected to the first section of the frame and the opposite end is connected to the second section of the frame.

6. The windmill as set forth in claim 1 wherein
said first section includes a vertical axis member and a horizontal axis member.

7. The windmill as set forth in claim 1 wherein
four blades are contained within the frame of the windmill and are angularly disposed in different directions such that of each of the blades, one end of the blade is connected to the first section of the frame and the opposite end is connected to the second section of the frame.

8. The windmill as set forth in claim 1 wherein
said apparatus is an alternator.

9. The windmill as set forth in claim 1 wherein
said apparatus is a generator.

10. A windmill comprising:
a multisided frame formed of an open framework through which wind can pass freely having a first multisided section and a second multisided where said first and second sections are rectangular in shape;
said first section and said second section connected together by at least one connecting member at said at least one corner;
at least two blades immediately adjacent to each other, each defining a plane such that the defined planes are angularly disposed to a horizontal axis such that said horizontal axis intersects said defined planes, connected at opposite ends of the blade to the multisided frame and completely contained within said multisided frame such that the blades are disposed in different directions such that of each of the blades, one end of the blade is connected to the first section of the frame and the opposite end is connected to the second section of the frame, such that as wind strikes the blade, the windmill is rotated about said horizontal axis;
at least one apparatus connected to the horizontal axis which is driven by the rotational force imparted by said windmill.

11. The windmill as set forth in claim 10 wherein
said first and second sections are square in shape.

12. The windmill as set forth in claim 10 wherein
said apparatus is an alternator.

13. The windmill as set forth in claim 10 wherein
said apparatus is a generator.

14. A windmill comprising:
a multisided frame formed of an open framework through which wind can pass freely having a first multisided section and a second multisided section where said first and second sections are rectangular in shape;
said first section and said second section connected together by at least one connecting member,
at least four blades [angularly disposed,] each defining a plane such that the defined planes are angularly disposed to a horizontal axis such that said horizontal axis intersects said defined planes, connected at opposite ends of the blade to the multisided frame and completely contained within said multisided frame such that the blades are disposed in difrferent directions such that of each of the blades, one end of the blade is connected to the first section of the frame and the opposite end is connected to the second section of the frame, such that as wind strikes the blade, the windmill is rotated about said horizontal axis;
at least one apparatus connected to the horizontal axis which is driven by the rotational force imparted by said windmill.

15. The windmill as set forth in claim 14 wherein said first and second sections are square in shape.

16. The windmill as set forth in claim 14 wherein said apparatus is an alternator.

17. The windmill as set forth in claim 14 wherein said apparatus is a generator.

\* \* \* \* \*